United States Patent [19]
Haseltine et al.

[11] Patent Number: 5,793,470
[45] Date of Patent: Aug. 11, 1998

[54] LATENT-IMAGE PROJECTION SYSTEM AND METHOD

[75] Inventors: Eric C. Haseltine, Manhattan Beach; Marshall M. Monroe, La Canada; Bruce M. Schechter, Altadena, all of Calif.; Bran Ferren, East Hampton, N.Y.; Nicholas F. Baum, East Hampton, N.Y.; Clinton B. Hope, East Hampton, N.Y.

[73] Assignee: The Walt Disney Company, Burbank, Calif.

[21] Appl. No.: 447,111

[22] Filed: May 22, 1995

[51] Int. Cl.$^6$ .................................................. G03B 21/14
[52] U.S. Cl. .................................................. 353/20; 349/96
[58] Field of Search .................................. 353/20, 21, 28, 353/29, 30, 7, 8; 359/464, 465, 458, 63; 349/58, 96

[56] References Cited

U.S. PATENT DOCUMENTS

| | | | |
|---|---|---|---|
| 2,290,651 | 7/1942 | Peck . | |
| 3,051,781 | 8/1962 | Ward . | |
| 3,807,072 | 4/1974 | Luxon | 353/20 |
| 4,623,219 | 11/1986 | Trias . | |
| 4,657,512 | 4/1987 | Meckleborg | 434/44 |
| 4,792,850 | 12/1988 | Liptoh et al. . | |
| 4,859,994 | 8/1989 | Zola et al. . | |
| 4,879,603 | 11/1989 | Berman . | |
| 4,928,123 | 5/1990 | Takafuji | 353/20 |
| 5,048,931 | 9/1991 | Magocs | 353/20 |
| 5,103,325 | 4/1992 | Andrews et al. . | |
| 5,287,130 | 2/1994 | Umeda | 353/20 |
| 5,335,022 | 8/1994 | Braun et al. | 353/20 |
| 5,469,295 | 11/1995 | Burke | 353/28 |
| 5,486,884 | 1/1996 | DeVaan | 353/20 |
| 5,488,496 | 1/1996 | Pine | 359/63 |

OTHER PUBLICATIONS

Correspondence dated Mar. 26, 1996 from Jerrold Pine of IEM, Inc. to Richard S. Erbe, Esq. of Walt Disney Imagineering (4 pages);.

Videotape entitled "Archive InvisiView Projection Systems".

*Primary Examiner*—William Dowling
*Attorney, Agent, or Firm*—Pretty, Schroeder & Poplawski

[57] ABSTRACT

A latent image projection system, and related method, for displaying entertaining visual effects and optical illusions by projecting a polarization-encoded latent image onto a polarization-preserving viewing screen. The latent image is revealed using a polarized analyzer having its polarization direction aligned with a polarization direction associated with the latent image. A "magic window" special effect is produced by sizing the analyzer to reveal only a portion of the latent image. A Pepper's Ghost image is created by orienting a dielectric plate so that its surface analyzes the latent image on the screen and superimposes it onto the image of a real object. A dielectric surface, such as a pond of water, placed between a viewer and the screen will analyze and reveal the latent image when the viewer views the reflection of the screen on the surface of the water. Selectively viewable subtitles for a movie are created by polarization encoding the light that illuminates the movie's film with alphanumeric images. The latent alphanumeric message are perceptible only to viewers viewing the screen using an analyzer.

46 Claims, 10 Drawing Sheets

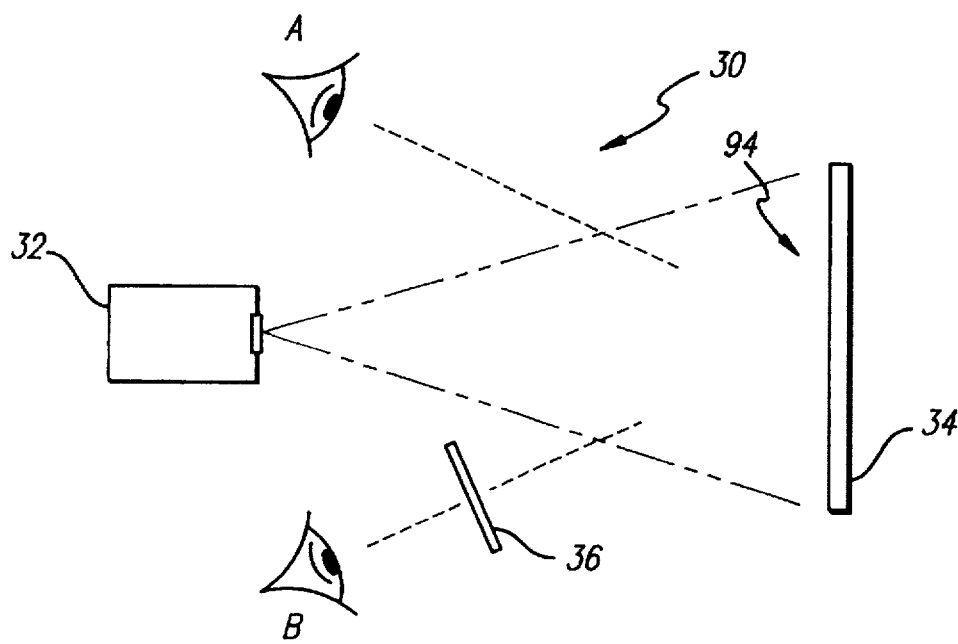
FIG. 10A
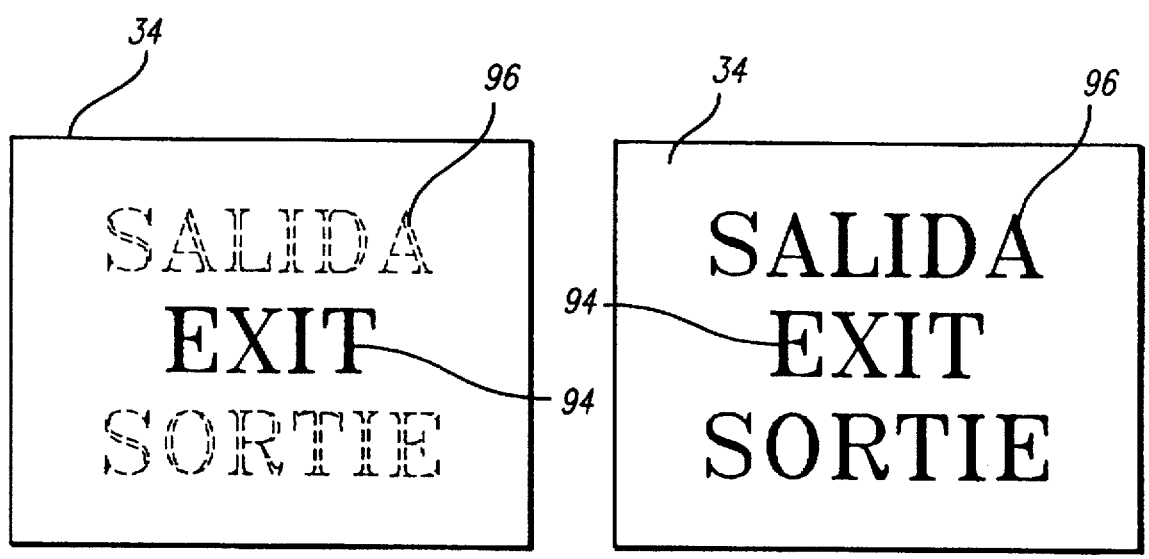
FIG. 10B
FIG. 10C

LATENT-IMAGE PROJECTION SYSTEM AND METHOD

BACKGROUND OF THE INVENTION

This invention relates generally to the creation and display of entertaining visual images and, more particularly, to the production and display of visual effects and optical illusions by projecting a polarization-encoded latent image onto a viewing screen.

A known video image projection system, shown in FIG. 1, and generally referred to by the reference numeral 10, contains a projector 12 that projects a video image onto a viewing screen 14. The projector includes a light source 16, a pre-polarizer 18, a transmissive-type liquid crystal (LC) matrix 20, an analyzer 22, and a projection lens 24. The light source uniformly illuminates an image area on the LC matrix with substantially parallel light rays. The pre-polarizer polarizes the light to have a single linear polarization direction before it reaches the LC matrix. The LC matrix includes an array of pixels that rotate the polarization of light passing through each of the pixels in response to an electric field applied to each pixel. To polarization encode the light with the video image, the LC matrix modulates the electric field applied to each pixel in response to a video signal.

The analyzer 22 is a second polarizer having its linear polarization direction oriented perpendicular to the polarization direction of the pre-polarizer 18 so that only the light having its polarization direction rotated by the LC matrix 20 passes through the analyzer. In some instances the analyzer is integral with the screen 14, but normally the analyzer is located between the LC matrix and the projection lens 24. After the polarization-encoded light passes through the analyzer, the projection lens projects the image onto the screen. The screen typically has a diffusely reflective coating 26 that allows viewing of a projected image by the unaided eye across a wide viewing angle.

In the video image projection system 10 described above, the video image is analyzed before it is diffusely reflected by the screen 14, and a visible image is readily perceived by the unaided eye merely by viewing the screen. Thus, the system's ability to produce entertaining visual effects generally is limited to those effects that have a viewer directly view the screen with the unaided eye.

Another known system displays alphanumeric messages for viewing only by selected viewers. The display includes an LC matrix illuminated from the rear by polarized light. The LC matrix rotates the polarization direction of the light to polarization encode the alphanumeric message. Only selected viewers are able to distinguish the alphanumeric images by viewing the LC matrix though polarized glasses. Other viewers, not wearing polarized glasses, will not see the alphanumeric images when viewing the LC matrix directly and instead will perceive a uniformly illuminated area. Since the cost of an LC matrix increases greatly with its size, the cost of producing a display using a direct view LC matrix for a large projection screen would be quite expensive. Also, the positioning of the display is limited by the need for an electrical connection to drive the display's LC matrix. Thus, displays that use a direct view LC matrix are limited in size and versatility.

Accordingly, there is a need for an imaging system that economically provides a polarization-encoded latent image on a relatively large screen for viewing by a large or selected audience using an analyzer. Also, there is a need for a latent-image display system that has a screen that can be located in an environment inconvenient or hostile to electrical components. The present invention satisfies this need.

SUMMARY OF THE INVENTION

The present invention is embodied in a latent-image projection system, and related method, for projecting a polarization-encoded image onto a polarization-preserving viewing screen that may be viewed by a selected audience using a polarizing analyzer. The image is latent in that it cannot be perceived except by viewers using the analyzer. The latent-image projection system provides a versatile viewing screen that can be conveniently sized and located as desired to create novel and entertaining visual special effects and optical illusions.

The latent-image projection system includes a latent-image projector, a polarization-preserving viewing screen, and an analyzer. The viewing screen diffusely reflects incident light without changing the light's polarization. The latent-image projector projects onto the screen a polarization-encoded latent image that is imperceptible to a viewer who directly views the screen. The light associated with the latent image has a predetermined polarization orientation. An analyzer, having a preferential polarization orientation that is aligned with the predetermined polarization orientation associated with the latent image, is located between the screen and one or more selected viewers so that a selected viewer, who uses the analyzer to view the screen, may perceive the latent image.

More particularly, the latent-image projector produces the latent image by directing light having a predetermined illumination pattern through an image area. The projector then alters the light's polarization orientation as it passes through the image area at predetermined locations throughout the image area without perceptibly altering the light's intensity at the predetermined locations. The projector then projects the polarization-encoded light passing through the image area onto the screen. The projector thus creates a latent image so that only the predetermined illumination pattern, and not the latent image, is perceived by viewers who directly view the screen and so that the latent image is perceived by the selected viewer who views the screen using the analyzer. The predetermined illumination pattern typically has a uniform light intensity so that viewers who directly view the screen see only a uniformly illuminated screen, while the selected viewer, who views the screen using the analyzer, sees the latent image.

In a more detailed feature of the invention, the latent image projector includes a light source, a pre-polarizer, a polarization rotator, and a projection lens. The light source uniformly illuminates the image area with a substantially parallel beam of light and the pre-polarizer polarizes the light from the light source to a first polarization orientation before the light illuminates the image area. The polarization rotator may be a transmissive-type liquid crystal matrix located in the image area. The matrix typically has a pixel array that defines the predetermined locations of the image area. The liquid crystal matrix rotates the polarization direction of the light at the predetermined locations in response to an electrical signal received from a video source as the light passes through the liquid crystal matrix to create the polarization-encoded latent image. Alternatively, the polarization rotator may be a transparent isotropic substrate having on one of its surfaces an anisotropic medium that rotates the polarization direction of the light at the predetermined locations as the light passes through the substrate. Typically, the anisotropic medium is a transparent half-wave retarding material that rotates the light's polarization orientation by 90 degrees and the preferential polarization orientation of the analyzer is oriented orthogonal to the polarization orientation of the pre-polarizer. The projection lens focuses the light passing through the polarization rotator onto the viewing screen.

In another more detailed feature of the present invention, the analyzer is a polarizer of transmissive material that is located in a line of sight between the screen and the selected viewer. Such an analyzer may be sized such that only a portion of the screen is viewed through the analyzer by the selected viewer thereby producing a magic window special effect. Further, the analyzer may include a movable support that controllably moves the analyzer to produce a magic spotlight special effect.

Alternatively, the analyzer is a specular dialectic surface that is located so that the selected viewer, who views an image of the screen reflected on the dielectric surface at a non-normal angle, may perceive the latent image. The specular dielectic surface may be the surface of a body of water located between screen wherein a selected viewer may perceive the latent image by viewing the reflected image of the screen on the surface of the water, but cannot perceive the latent image by directly viewing the screen.

In another aspect of the present invention, the latent-image projection system further includes a vehicle for inducing relative motion between one or more viewers and the analyzer. The vehicle aligns the analyzer between the viewers and the screen during only a part of the relative motion so that the viewers can perceive the latent image when the analyzer is aligned between the viewers and the viewing screen. However, the viewers cannot perceive the latent image during the rest of the relative motion when the analyzer is not aligned between the viewers and the screen. Preferably, the vehicle is a passenger vehicle that moves the viewers along a path past the viewing screen and the analyzer is placed at a predetermined location along the path such that, as the vehicle passes the viewing screen, the viewers are unable to perceive the latent image until the vehicle is adjacent to the analyzer.

In an alternative feature of the present invention, the latent-image projection system further includes a visible image projector that projects a visible image onto the screen superimposed on the latent image so that viewers who view the screen directly perceive only the visible image without perceiving the latent image and the selected viewer, who views the screen using an analyzer, sees the latent image. In one preferred configuration, the visible image is a polarized visible image having its polarization orientation oriented orthogonal to the polarization orientation associated with the latent image so that viewers, who view the screen directly or through an analyzer having its polarization orientation oriented orthogonal to the polarization orientation associated with the latent image, perceive only the polarized visible image, and the selected viewer, who views the screen using an analyzer having its polarization orientation oriented orthogonal to the polarization orientation of the visible image, perceives only the latent image. In another configuration, the polarization orientation of the latent image is aligned with the polarization orientation of the visible image so that the selected viewer, who views the images using an analyzer having its polarization orientation aligned with the polarization orientation of the images, perceives the latent image superimposed on the visible image.

In a similar feature of the invention, the polarization-preserving viewing screen includes an integral sign having a visible message and the latent image includes a foreign language translation of the sign's message. Alternatively, the sign can be located adjacent to the viewing screen. Only the selected viewer, who views the screen using an analyzer, will perceive the foreign language translation of the sign provided by the latent image.

In another feature of the present invention, the latent-image projection system further includes a real three-dimensional object located to one side of the screen. Also, the analyzer is a dielectic surface oriented such that direct light rays from the real object are transmitted through the analyzer and such that light from the screen having a desired polarization orientation is reflected off the dielectic surface so that the latent image provides a ghost-like image superimposed over the real object.

In another more detailed feature of the present invention, a portion of the latent image contains alphanumeric subtitles relating to a visible image projected on the screen. In one embodiment, a transmissive-type liquid crystal matrix or other polarization-rotating device, located in a lower portion of the image area, rotates the polarization direction of the light at the predetermined locations in response to an electrical signal received from an alphanumeric image source as the light passes through the liquid crystal matrix to create the polarization-encoded latent subtitles. Visible image film, located in the image area, is illuminated by the light from the light source, including the light passing through the liquid crystal matrix display, and the light passing through the film is projected and focused onto the viewing screen. Thus, the selected viewer who views the screen using the analyzer perceives the alphanumeric subtitles whereas viewers who directly view the screen cannot perceive the alphanumeric subtitles.

In a similar embodiment of the present invention, the polarization-preserving viewing screen is located below a main screen. A visible image having a temporally variable intensity, such as a motion picture, is projected onto the main screen and a latent image, such as subtitles for the motion picture, is projected onto the viewing screen. A photosensor generates an intensity signal based on the average intensity of the visible image on the main screen. A control circuit uses the intensity signal to cause the latent-image projector to adjust the intensity of the latent image such that the intensity of the latent image varies in response to the intensity of the visible image. Accordingly, the latent image on the viewing screen is less distractive to the unaided eye.

In a more detailed feature, the latent-image projector, to adjust the intensity of the latent image, includes a variable attenuator that varies the intensity of the light from the light source in response to the control signal generated by the control circuit. Alternatively, the control circuit adjusts the voltage applied to the light source to adjust the intensity of the latent image.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 10A is a schematic diagram of the optical arrangement of a eighth embodiment of a latent-image projection system of the present invention, for projecting a latent image onto a viewing screen having an integral sign.

FIG. 10B is a schematic representation of an unanalyzed polarization-encoded latent image projected onto the viewing screen having an integral sign, in accordance with the embodiment of the present invention shown in FIG. 10A.

FIG. 10C is a schematic representation of the polarization-encoded latent image and the sign of FIG. 10B, viewed through an analyzer in accordance with the present invention.

DESCRIPTION OF THE PREFERRED EMBODIMENTS

Figure 1:
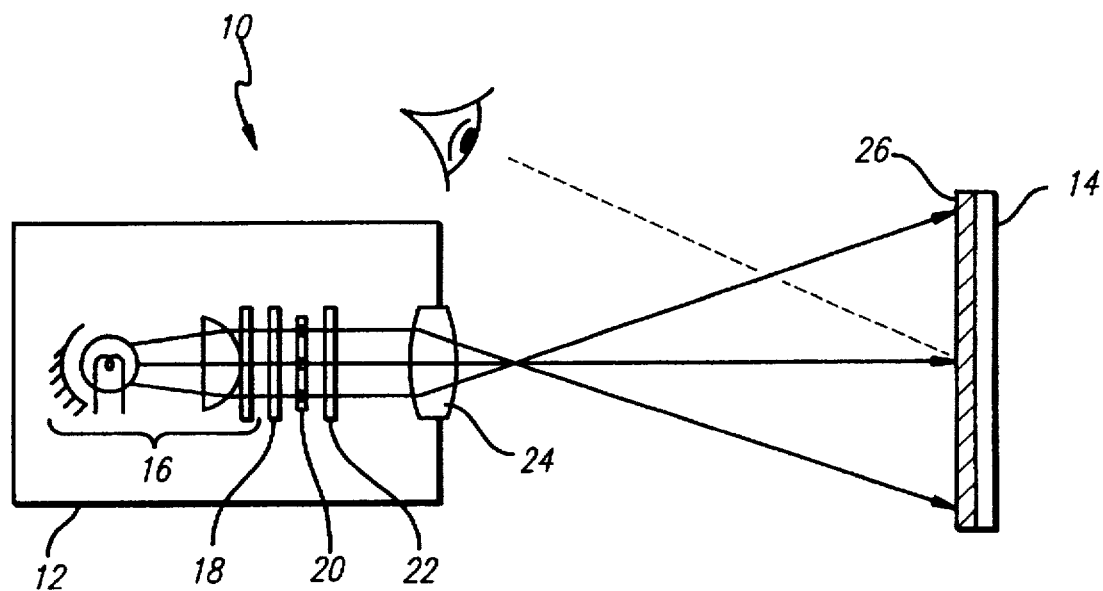
FIG. 1 is a schematic diagram showing the optical construction of a video projection system of the prior art.
Figure 2:
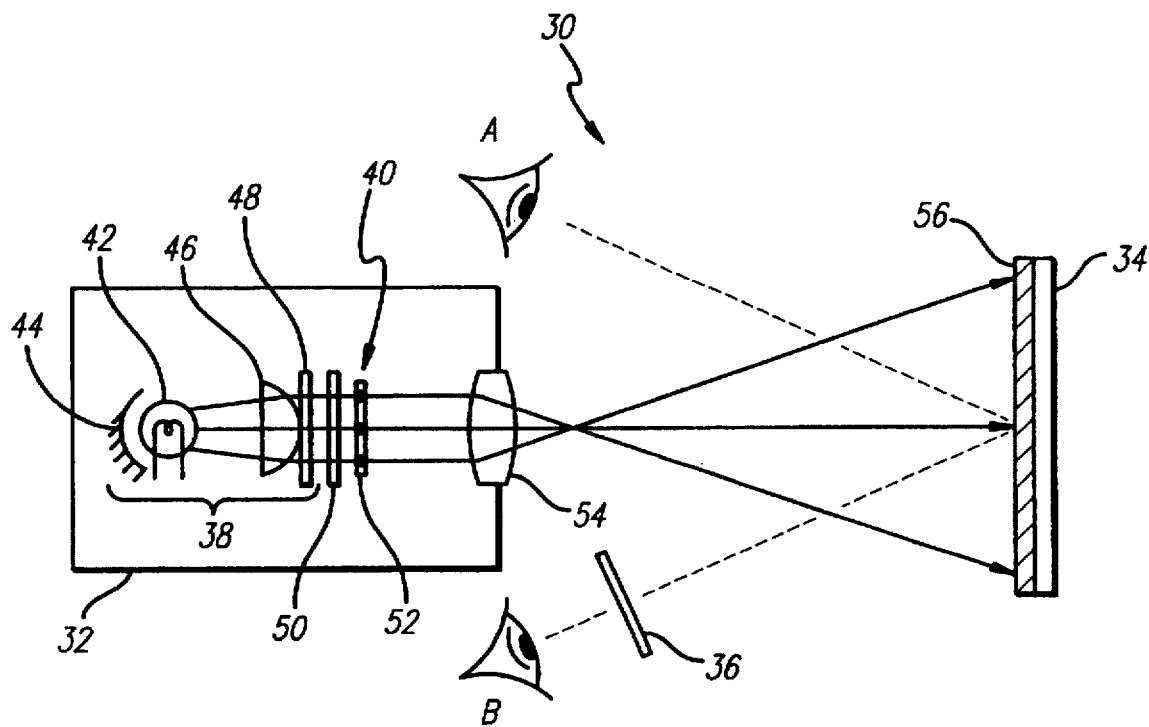
FIG. 2 is a schematic diagram showing the optical construction of a first embodiment of a latent-image projection system of the present invention.

As shown in the exemplary drawings, and particularly in FIG. 2, the present invention is embodied in a latent-image projection system 30, and related method, for use in creating entertaining visual effects or optical illusions. The projection system is shown having a latent-image projector 32, a polarization-preserving screen 34, and a polarizing analyzer 36. The system projects a latent image onto a relatively large screen and selectively places the analyzer to allow selected viewers to see a visual image on the screen while other viewers, not associated with the analyzer, see only a uniformly illuminated screen.

The latent-image projector 32 includes a light source 38 that uniformly illuminates an image area 40. The light source typically includes a theater projector-type light bulb 42 with a reflector 44 placed behind the light source and a collimating lens 46 placed in front of the light source. After the collimating lens, the light rays from the light source form a substantially parallel beam of light. A heat filter 48 is placed in the path of the light beam after the collimating lens to remove excess heat from the light. A pre-polarizer 50, oriented with its polarization axis in a vertical direction, allows only vertically polarized light to pass to the image area.

A latent image is formed in the image area 40 by rotating the polarization of the light at various locations in the image area using a variable polarization rotator 52. A representative polarization rotator is a transmissive-type LC matrix divided into individually addressable pixels of twisted nematic liquid crystals. The polarization rotation produced by each pixel is continuously variable and controlled by the magnitude of the electric field applied to the respective pixel. Alternatively, other electro-optic devices that rotate the lights polarization direction can be used for the polarization rotator such as KDP modulators, ceramic piezo-electric modulators, Pockles cells, Faraday cells, or the like.

To produce a full color display, the pixels are divided into groups of three pixels with three primary color filters placed over the three pixels, respectively, of each pixel group. The LC matrix does not change the intensity of the light passing through it and the latent image produced by the LC matrix is not readily discernable to the unaided eye. Since the LC matrix typically is driven by a video source, a full-motion color image may be encoded in the latent image.

Alternatively, the polarization rotator 52 can be a glass plate, or the like, coated with a passive retardation material such as mica or Mylar. In the retardation material, light having one polarization direction travels slower than light of another polarization direction. A static latent image is produced by varying the retardation material's thickness across the image area which, accordingly, varies the rotation of the light's polarization direction across the image area. Maximum image contrast is obtained by orienting the retardation material so that the light's polarization direction is rotated by 90 degrees. As an example, if the crystalline optical axis of a half-wave retarding material is oriented at 45 degrees to the plane of the pre-polarizer 30, the light passing through the half-wave retarding material has its polarization direction rotated by 90 degrees.

A projection lens 54 focuses and projects the light transmitted through the polarization rotator 52 onto the screen 34. The screen must locally preserve the polarization direction of the incident light while reflectively dispersing the incident light over a wide viewing angle. A coating of aluminum paint 56 has been found to be suitable reflective coating that preserves the polarization of the incident light. Since the eye cannot distinguish between light of different polarization directions, the screen will appear uniformly illuminated to a viewer at viewing position A.

Figure 3A:
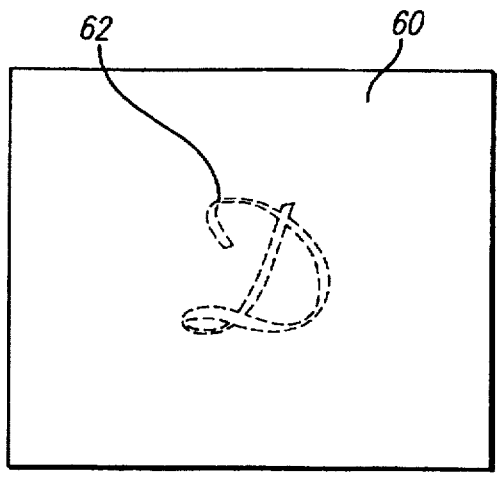
FIG. 3A is a schematic representation of an unanalyzed polarization-encoded latent image projected onto a viewing screen of the latent-image projection system of FIG. 2, in accordance with the present invention.

An example of a latent image projected by the latent-image projection system 30 is shown in FIG. 3A. The dotted lines indicating the outline of the letter are not visible to the unaided eye and are included in the drawing merely to indicate the polarization direction boundaries of the latent image. In this example, the light in the background area 60 has a horizontal polarization direction and the light in the area 62 within the dotted lines, representing the letter D, has a vertical polarization direction.

Figure 3B:
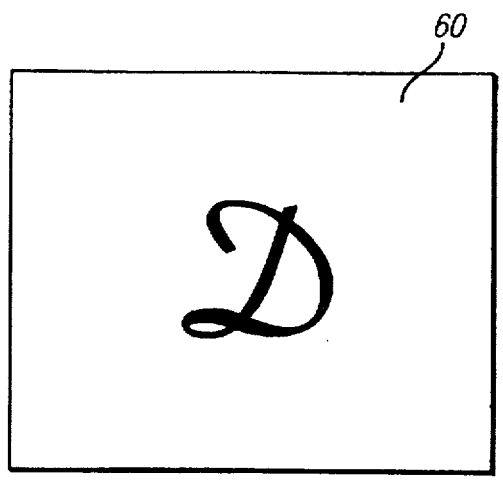
FIG. 3B is a schematic representation of the polarization-encoded latent image of FIG. 3A, viewed through an analyzer in accordance with the present invention.

To reveal the latent image, the polarizing analyzer 36 is placed between the screen 34 and a viewer at viewing position B. The analyzer shown in FIG. 2 is a polarizer of transmissive material such as a Polaroid material, a stack polarizer, a wire grid type polarizer, or the like. The analyzer has its polarization direction oriented orthogonal or perpendicular to the polarization direction of the pre-polarizer 50. In this example, the analyzer is oriented to pass only the light having a horizontal polarization direction, i.e., the light that had its polarization direction rotated by the polarization rotator 52. Thus, as shown in FIG. 3B, a selected viewer at viewing position B is able to perceive through the analyzer the latent image in all its detail, in this case the letter D. Note that if the polarization direction of the analyzer is rotated 90 degrees so that it is parallel to the polarization direction of the pre-polarizer, the background area would be black and the letter D would be white.

The polarization rotator 52 defines the detail of the perceived latent image. For example, as discussed above, an LC matrix having pixels that can rotate the light's polarization direction at any angle between 0 and 90 degrees in response to a video signal can produce fully animated gray-scale or black and white images. Similarly, an LC matrix having grouped pixels associated with three primary colors, such as a red-green-blue delta triad configuration with color filters positioned over each sub-pixel, can produce animated full-color images. Similarly, full-color images can be produced by optically combining light from separate LC matrices, each illuminated by a different primary color. A glass plate coated with a retardation material would produce static single-color images. The static image's color merely would be the color of the light source that illuminates the plate.

Figure 4A:
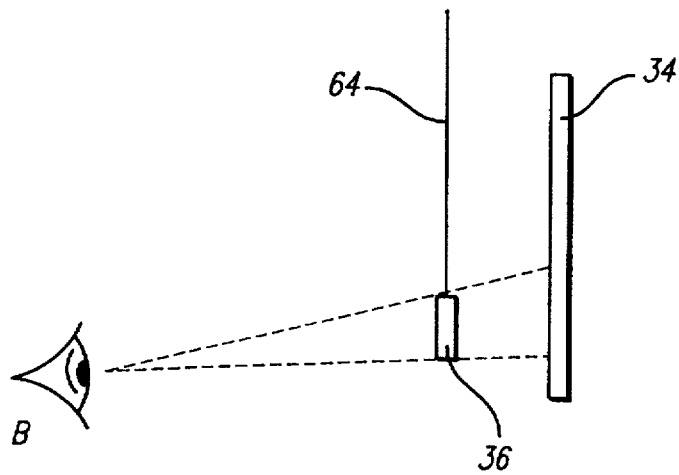
FIG. 4A is a schematic diagram of the optical arrangement of a second embodiment of a latent-image projection system of the present invention, having a "magic window" analyzer that allows viewing of only a portion of a viewing screen.
Figure 4B:
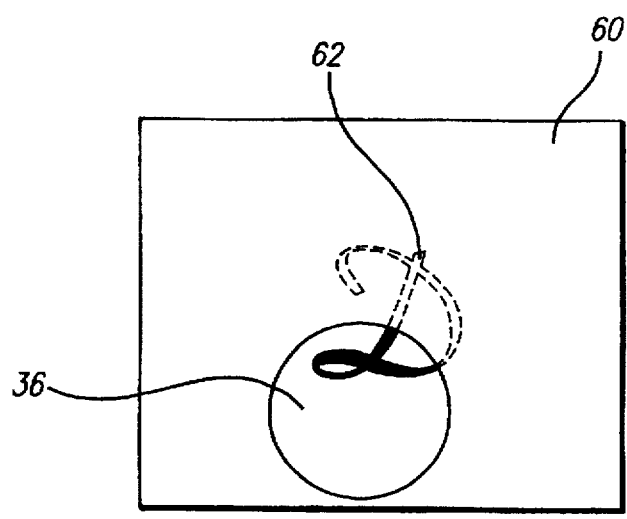
FIG. 4B is a schematic representation of the latent image of FIG. 3A, viewed through a "magic window" analyzer, in accordance with the embodiment of the present invention shown in FIG. 4A.

In one embodiment of the invention, shown in FIG. 4A, a circularly shaped analyzer 36 is placed sufficiently far away from a selected viewer at position B so that only part of the screen 34 can be viewed through the analyzer. Accordingly, as shown in FIG. 4B, only part of the latent image 62 is revealed to the viewer, thus creating a "magic window" or "magic viewing portal" special effect. Additionally, if the circular analyzer included a moveable support 64, such as wires or the like, then different portions of the latent image would be perceived as the analyzer was moved across the field of view of the screen. Thus, the analyzer could be used to create special effects, such as a moving "X-ray beam" or a "magic spotlight." Although a circularly shaped analyzer is shown, the analyzer can have any desired shape.

Figure 5:
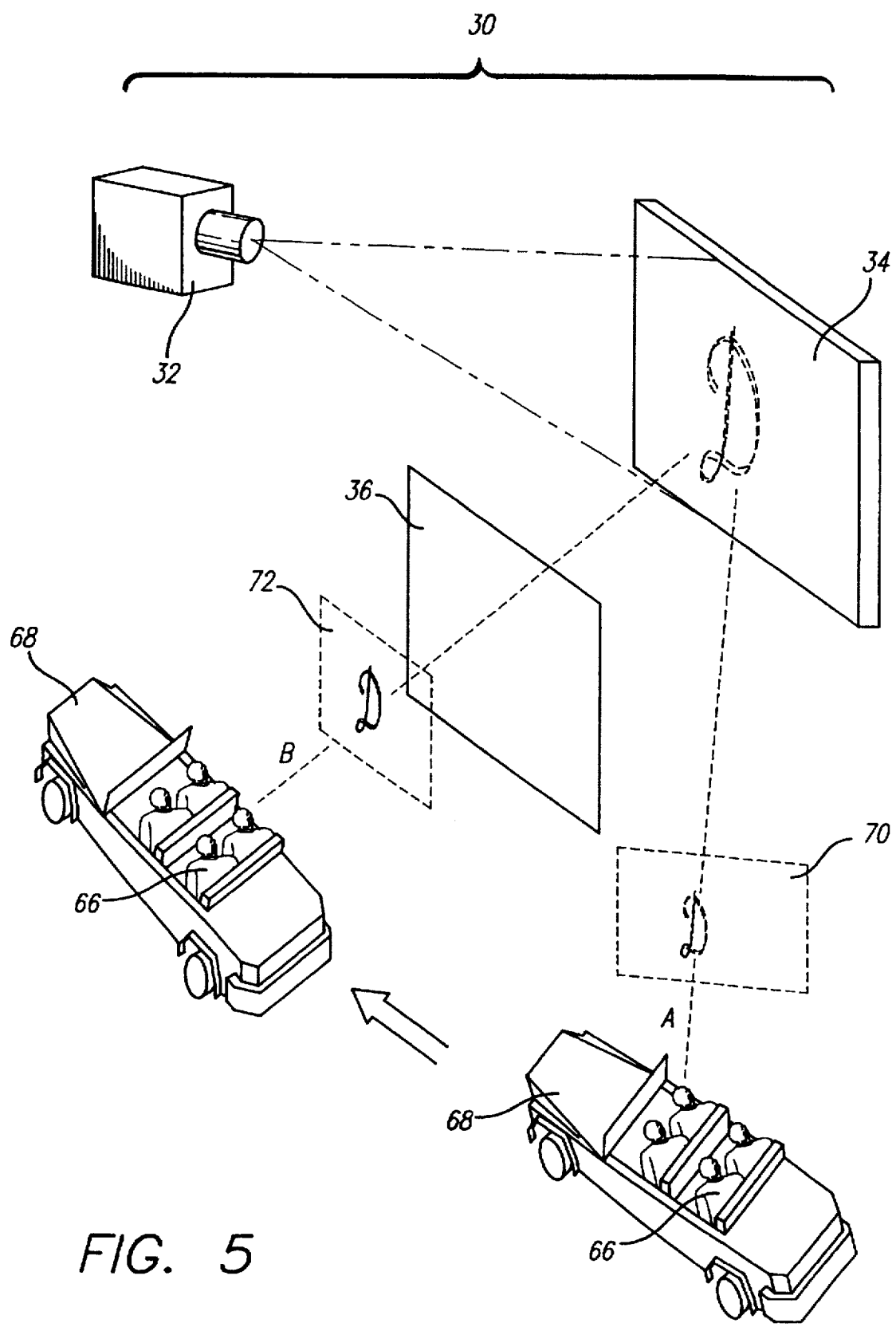
FIG. 5 is a perspective view of a third embodiment of a latent-image projection system of the present invention, showing a vehicle for moving viewers in relation to an analyzer and a screen having a projected latent image.

In an alternative embodiment of the latent image projection system 30 of the present invention, shown in FIG. 5, the viewers are passengers 66 in a tracked vehicle 68 and, as before, the latent image is projected onto the screen 34 by the projector 32. A large analyzer 36 is located between the screen at position B along the vehicle's path sufficiently close to the path so that the passengers can view the entire screen through the analyzer. When the vehicle is at position A, the passengers observe a uniformly-illuminated blank screen, as indicated by the blank image area 70. After the vehicle moves to position B, the passengers view the screen through the large analyzer and perceive the latent image, as indicated by the analyzed image area 72. After the vehicle travels further down the track, the analyzer again is not aligned between the vehicle and the screen, and the passengers again observe only a uniformly-illuminated blank screen.

Figure 6:
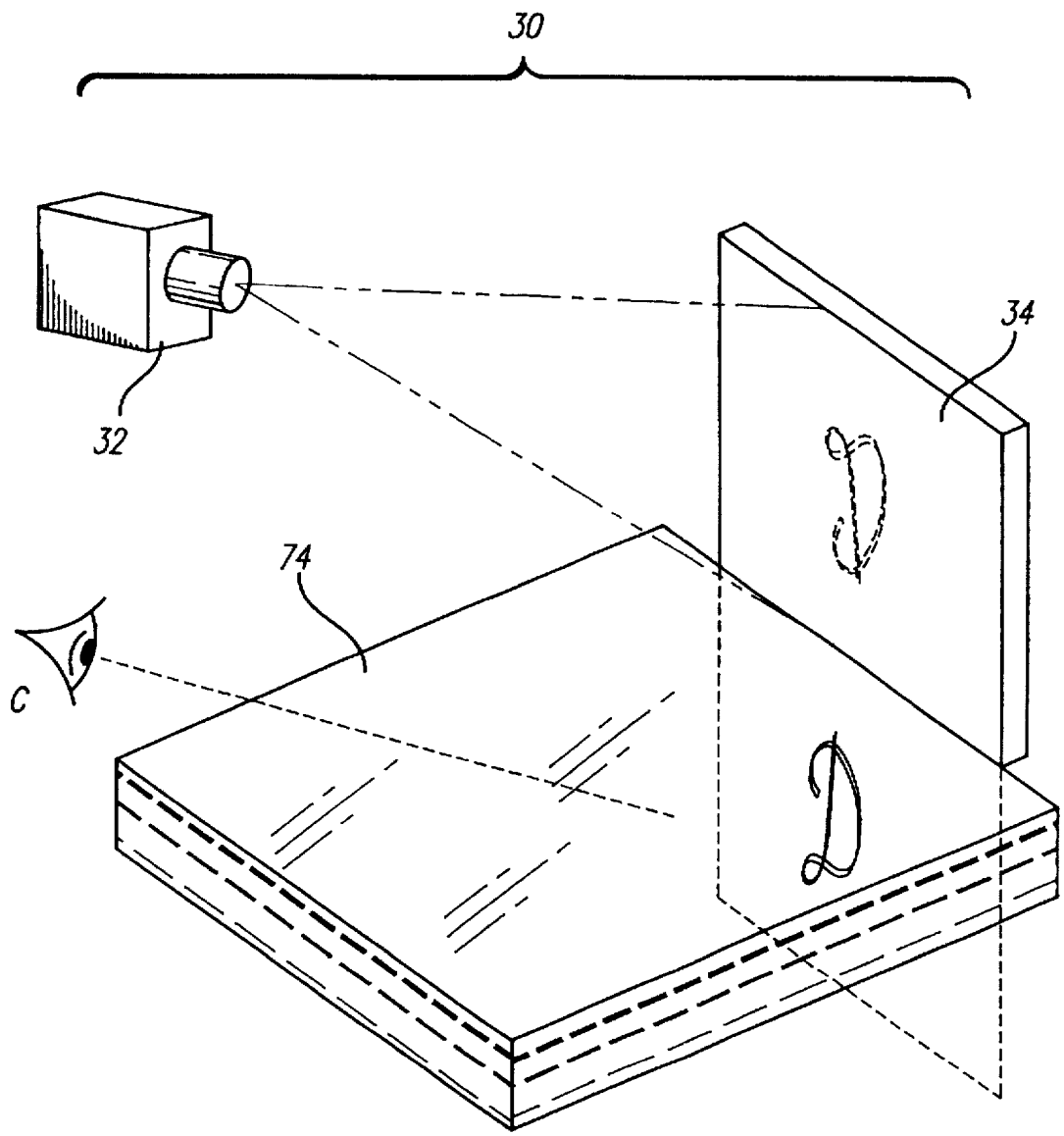
FIG. 6 is a perspective view of a fourth embodiment of a latent-image projection system of the present invention, that allows viewing of a projected latent image by looking at a reflection of the latent image through a dielectric surface such as the surface of a pool of water.

Another embodiment of the latent-image projection system 30 of the present invention is shown in FIG. 6. This embodiment takes advantage of the polarizing properties of a specular dielectic surface 74. Light that is incident on the dielectric surface at a non-normal angle of incidence will have one polarization direction preferentially reflected. More specifically, light having an electric field vector oriented perpendicular to the plane of incidence at the dielectric surface will be preferentially reflected with respect to light whose electric field vector is oriented parallel to the plane of incidence. Further, at a certain angle of incidence, termed the Brewster's angle, only light having electric field vector oriented perpendicular to the plane of incidence at the dielectric surface will be reflected from the surface.

In FIG. 6, the specular dielectic surface, shown as a section of a water pond, is located between a viewer at position C and the screen 34. The projector 32 projects a latent image onto the screen and, as described above, a viewer looking directly at the screen will see merely a uniformly-illuminated blank screen. However, when the viewer looks at a reflection of the screen on the surface of the water, the viewer will be able to perceive the latent image since, as described above, the light reflected by the water's surface is preferentially polarized. Note that the latent image is inverted as it is reflected by the water's surface.

Figure 7:
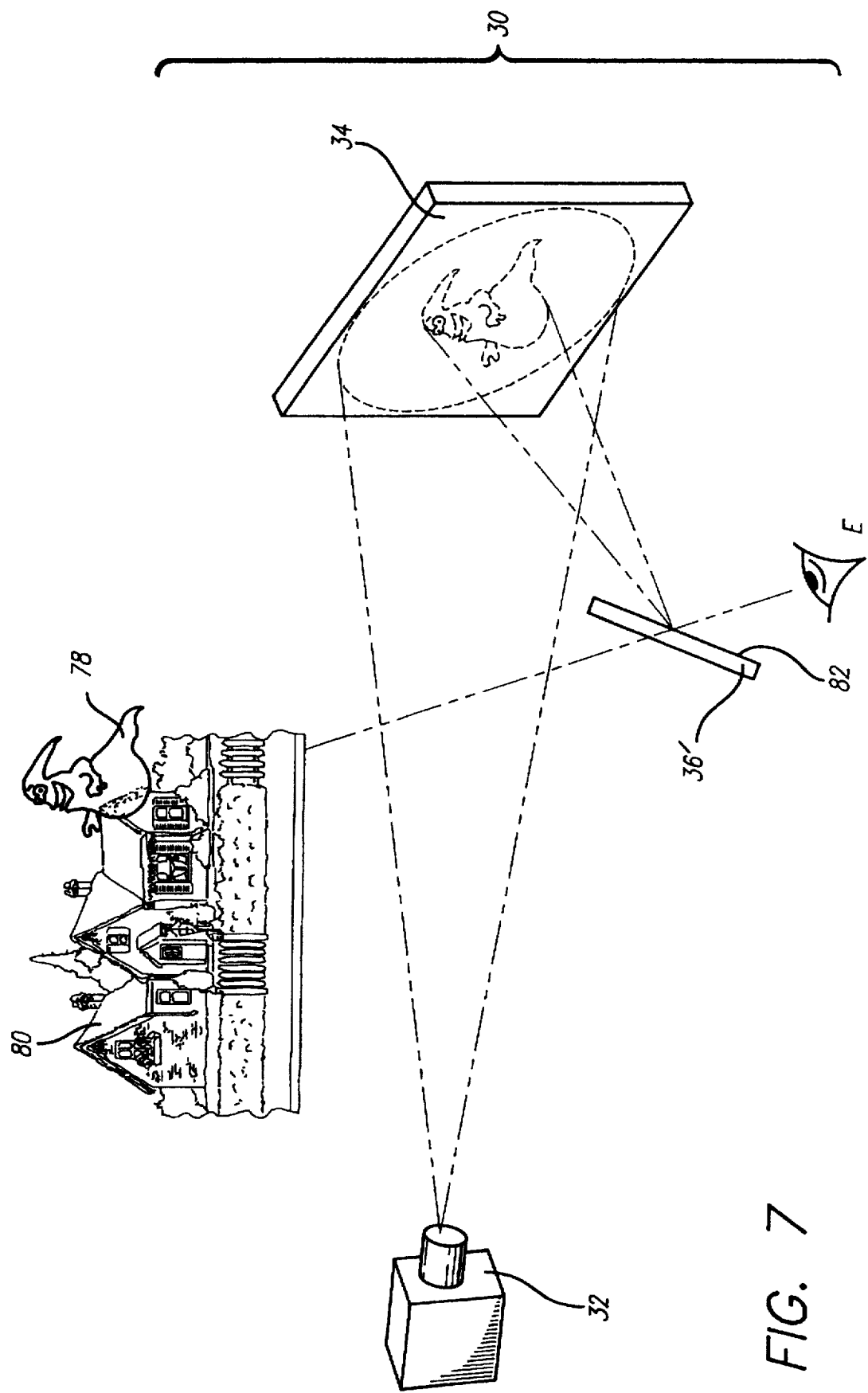
FIG. 7 is a perspective view of a fifth embodiment of a latent-image projection system of the present invention for creating a visual effect of a virtual ghost image superimposed on a real object.

Another embodiment of the latent-image projection system 30 of the present invention allows the presentation of a Pepper's Ghost virtual image 78 superimposed on a real three-dimensional object 80, as shown in FIG. 7. The projector 32 projects a latent image, shown as a ghost figure, onto the screen 34 and a specular dielectric surface 82, shown as the surface of a dielectric plate 36', is used to view the latent image on the screen. The real object, shown here as a house, is placed behind the dielectric plate. Since the dielectric plate is transparent, at least a portion of light from the real object will be visible through the dielectric plate by a selected viewer at point E. The dielectric plate's surface is oriented so that the viewer sees the light reflected from the screen superimposed over the image of the real object. Preferably, the dielectric plate's surface is oriented so that the angle of incidence of the light from the screen is substantially at or near the Brewster's angle. Accordingly, the latent image created by the light reflected by the dielectric plate's surface will appear to the viewer as a Pepper's Ghost image superimposed on the real object. Since the screen appears blank when viewed directly, the screen may be in plain view and a viewer will not know that the screen is the source of the ghost image. Other Pepper's Ghost techniques typically require the screen to be hidden from view.

Figure 8A:
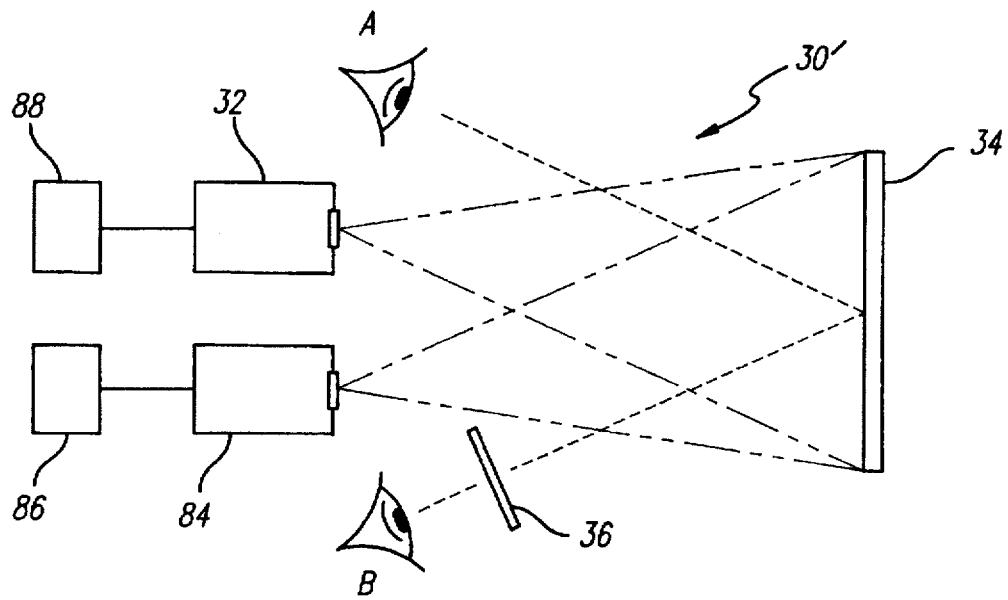
FIG. 8A is a schematic diagram of the optical arrangement of a sixth embodiment of a latent-image projection system of the present invention for substituting a visible image with a latent image or selectively superimposing a latent image on a visible image.
Figure 8B:
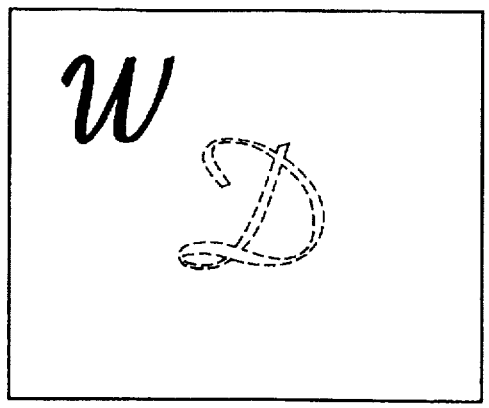
FIG. 8B is a schematic representation of an unanalyzed polarization-encoded latent image and a visible image projected onto a viewing screen of the latent-image projection system of FIG. 8A, in accordance with the present invention.
Figure 8C:
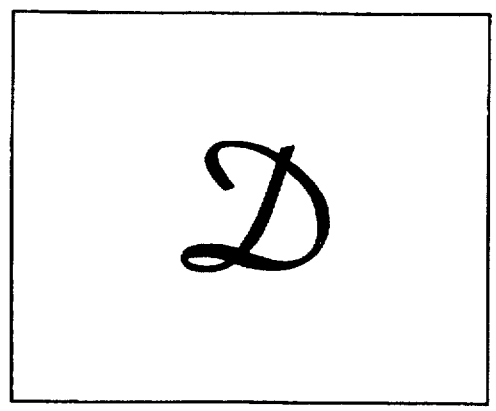
FIG. 8C is a schematic representation of an analyzed latent image substituting an orthogonally polarized visible image, in accordance with the embodiment of the present invention shown in FIG. 8A.

An additional embodiment of a latent image projection system 301 of the present invention is shown in FIGS. 8A–8D. This embodiment allows for visual effects such as image substitution or selectively viewable composite images. A visual image projector 84 simultaneously projects a vertically-polarized visible image onto the screen 34 over a projected polarization-encoded latent image. The light associated with the latent image is horizontally polarized. For simplicity, the visible image is indicated by the letter W and the latent image is indicated by the letter D. However, the visible image and the latent image preferably are video images provided, respectively, by the video sources 86 and 88. The vertically polarized visible image is perceptible to the unaided eye and a viewer at position A not using an analyzer merely will see the visible image and will not see the latent image (FIG. 8B). However, a selected viewer at position B, viewing the screen using an analyzer 36 having its polarization direction oriented in a horizontal direction, will see only the latent image and will not see the visible image (FIG. 8C). Thus, a viewer moving from position A to position B will see the vertically-polarized visible image disappear and will see the horizontally-polarized latent image appear.

Figure 8D:
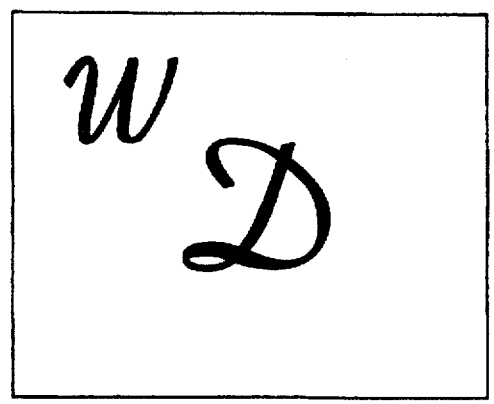
FIG. 8D is a schematic representation of an analyzed latent image superimposed on a visible image, in accordance with the embodiment of the present invention shown in FIG. 8A.

Alternatively, if the analyzer 36 is oriented with its polarization direction in a vertical direction, a viewer moving from position A to position B will see the latent image appear superimposed on the existing vertically-polarized visible image, creating a selectively viewable composite image effect (FIG. 8D).

Figure 9A:
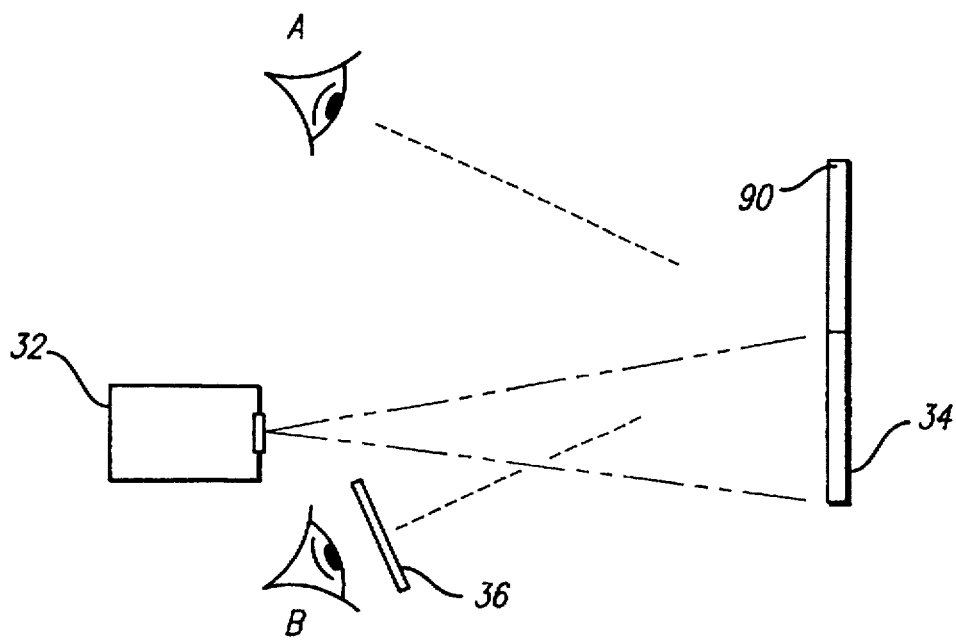
FIG. 9A is a schematic diagram of the optical arrangement of a seventh embodiment of a latent-image projection system of the present invention, for projecting a latent image onto a viewing screen located adjacent to a related sign or visible image.
Figure 9B:
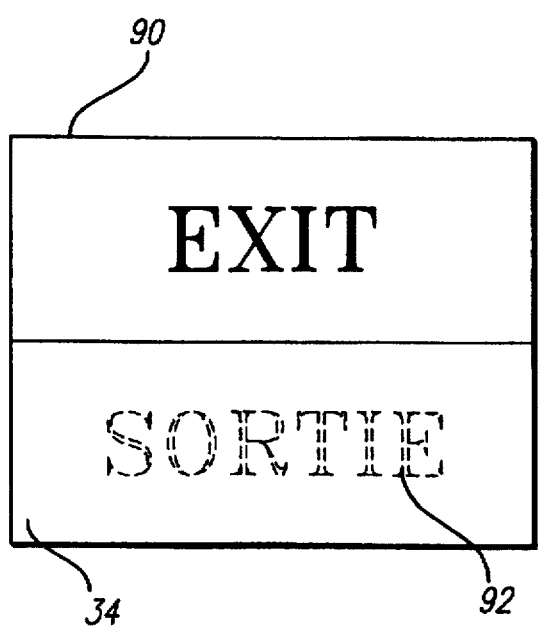
FIG. 9B is a schematic representation of an unanalyzed polarization-encoded latent image projected onto a viewing screen located below a sign, in accordance with the embodiment of the present invention shown in FIG. 9A.
Figure 9C:
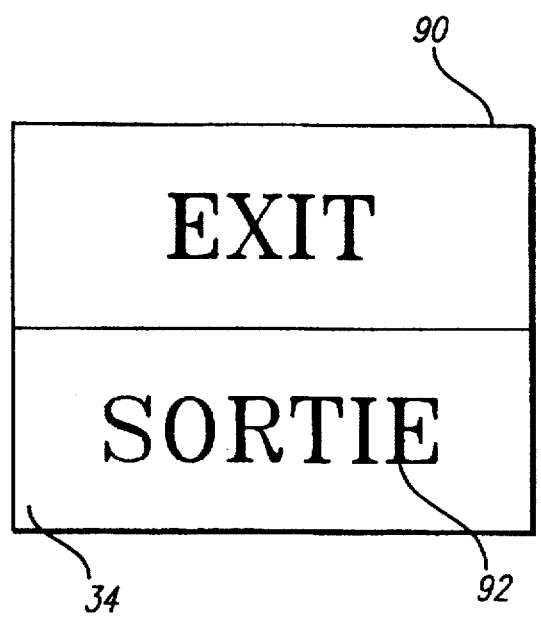
FIG. 9C is a schematic representation of the polarization-encoded latent image and the sign of FIG. 9B, viewed through an analyzer in accordance with the present invention.

A similar embodiment of a latent image projection system 30 of the present invention is shown in FIGS. 9A–9C. In this embodiment, a polarization preserving screen 34 is located adjacent to a sign 90 or other visible information. The sign, by way of example, contains the word "EXIT" and the latent image 92 projected onto the screen provides a translation of the sign into a foreign language. In this case, the latent image contains the French word "SORTIE." All viewers at positions A and B will see the word "EXIT," but only selected viewers, who view the screen using an analzyer 36 (position B), will perceive the polarization-encoded word "SORTIE."

Another similar embodiment of a latent image projection system 30 of the present invention is shown in FIGS. 10A–10C. In this embodiment, a sign 94 or other visible information is shown integral with a polarization preserving screen 34. As described previously, all viewers at positions A and B will see the sign, but only selected viewers, who view the screen using an analyzer 36 (position B), will perceive the latent image 96 having foreign language translations of the sign.

Figure 11A:
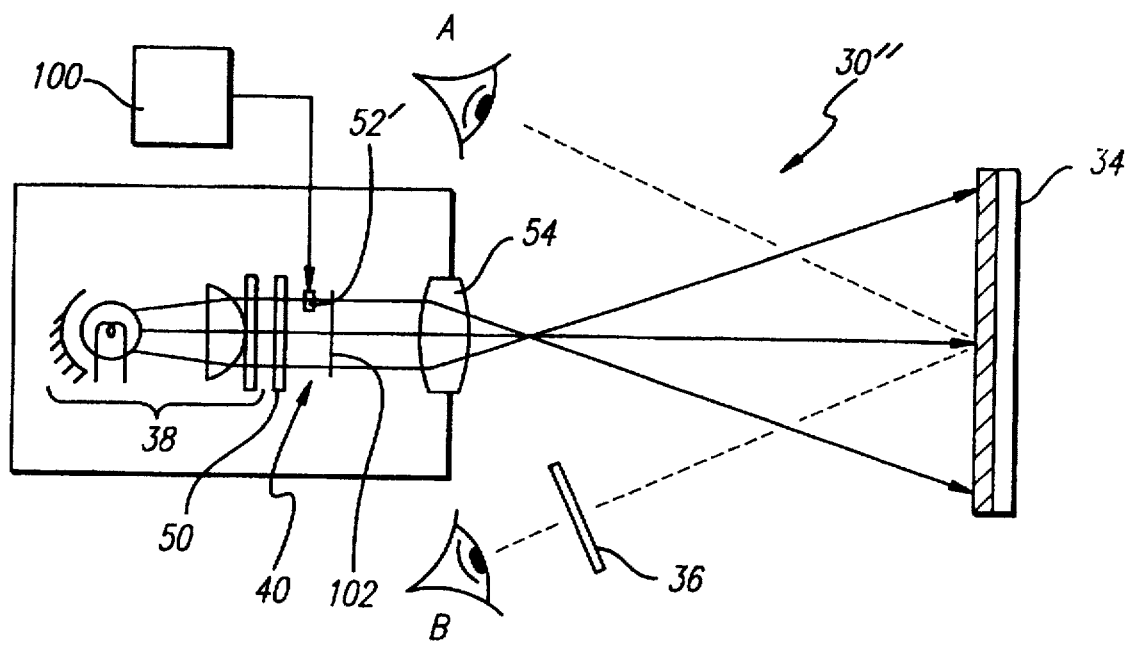
FIG. 11A is a schematic diagram of the optical construction of a ninth embodiment of a latent-image projection system of the present invention for providing subtitles to a motion picture using a polarization-encoded latent image.
Figure 11B:
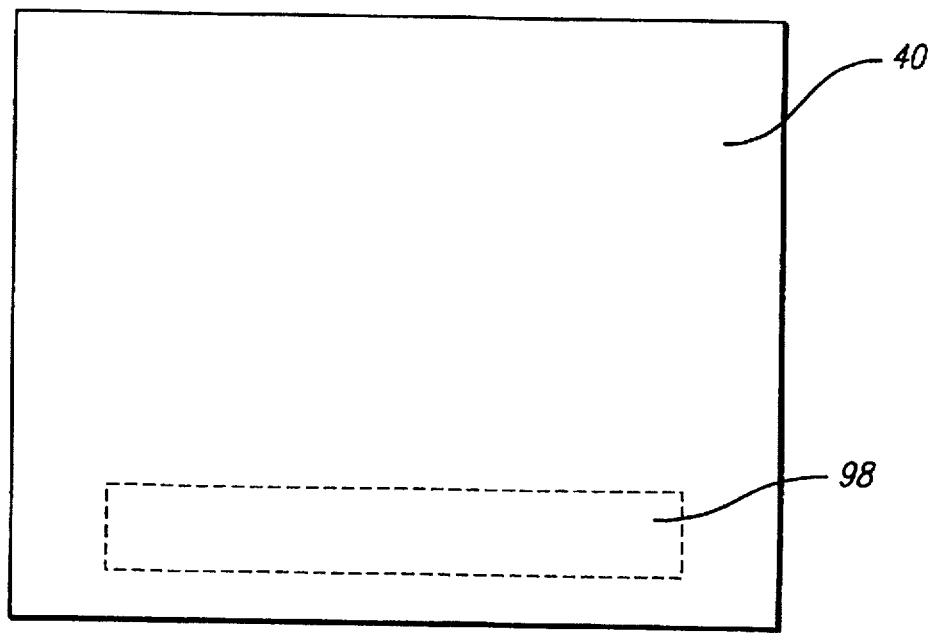
FIG. 11 is a schematic representation of an image area indicating the area having the polarization-encoded latent subtitles, in accordance with the embodiment of the present invention shown in FIG. 11A.

An embodiment of a latent-image projection system 30" of the present invention, shown in FIGS. 11A–11B, allows selective subtitling of motion pictures or movies for the hearing impaired or for providing foreign language translation of the movie's script. The polarization rotation of the transmissive LC matrix 52', described above, or other polarization-rotating device, is adjusted to provide alphanumeric images that contrast with the movie's visible image. Although the LC matrix can cover the entire image area 40, it need occupy only a portion 98 of the image area that corresponds to the area of the subtitles since, as shown in FIG. 11B, the area of the subtitles occupies only a portion of the projected image.

The light from the light source 38 is polarized by the pre-polarizer 50 and is then polarization encoded with the latent image by the LC matrix 52'. The alphanumeric images are provided by an alphanumeric image signal source 100. The light then illuminates a frame of film 102 and, after passing through the film, is focused and projected onto the screen 34. Thus, viewers at position A, not viewing the screen through an analyzer, will see the film as it normally appears and will not be aware of the latent image. However, selected viewers at position B viewing the screen through the analyzer 36, which has its polarization direction oriented parallel to the polarization direction of the pre-polarizer 50, will view the latent alphanumeric image cut out of the visible image. Note that viewers at position A do not observe a distracting, uniformly-illuminated strip beneath the screen since the alphanumeric latent image is polarization encoded in the film image.

Although this technique is used for creating subtitles, it can be used for any application in which it is desired to project onto the screen 34 an illumination pattern of visible light that has an embedded polarization-encoded latent image that can be perceived only by selected viewers associated with the analyzer 36.

Figure 12A:
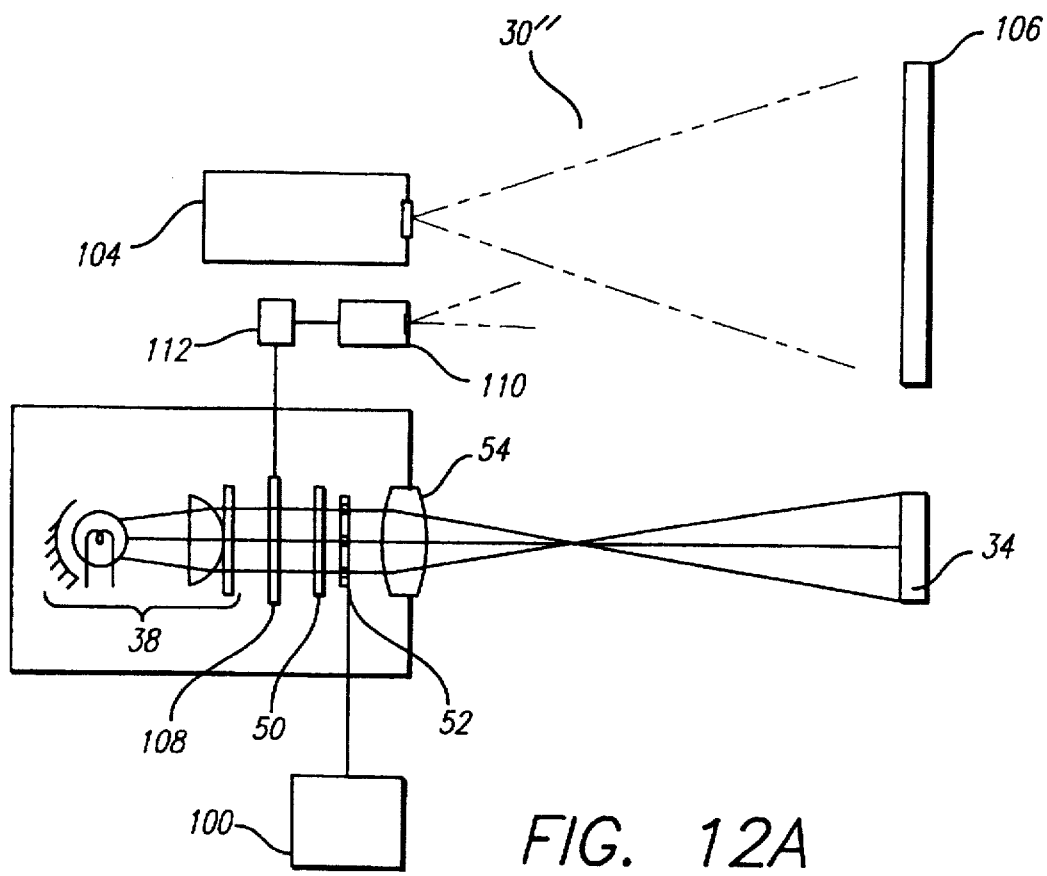
FIG. 12A is a schematic diagram of the optical construction of a tenth embodiment of a latent-image projection system of the present invention for providing subtitles to a motion picture using a polarization-encoded latent image having a variable light intensity.
Figure 12B:
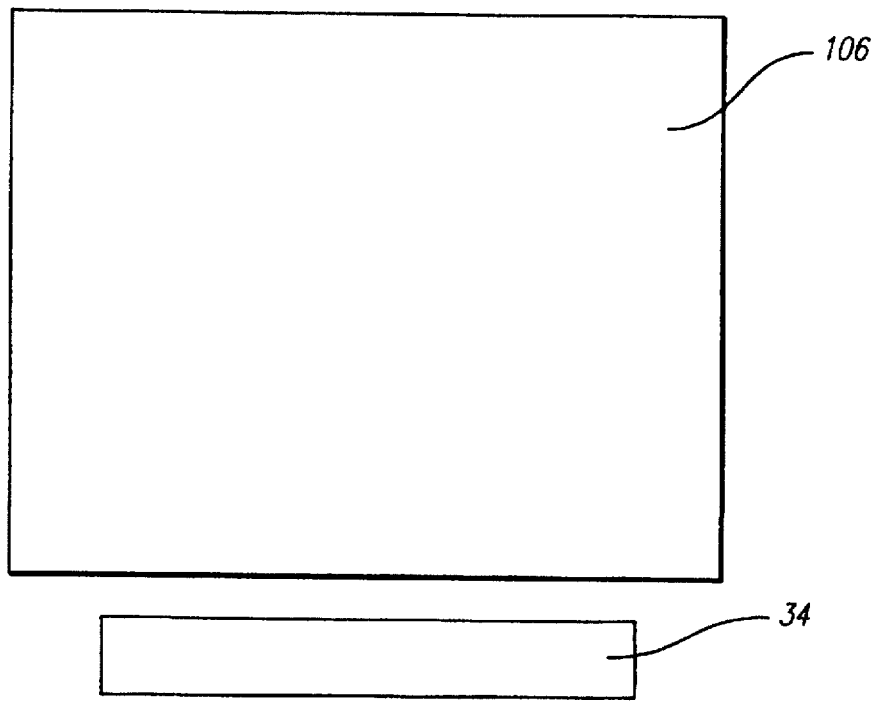
FIG. 12B is a schematic representation of a latent image screen for providing, below a motion picture screen, subtitles having a variable light intensity, in accordance with the embodiment of the present invention shown in FIG. 12A.

An alternative embodiment of the present invention, shown in FIGS. 12A and 12B, provides subtitles to select viewers without modifying existing film or video projection equipment. An existing projector 104 projects a visible image onto a main theater screen 106. A latent image projector 32' projects the subtitles onto a polarization-preserving screen 34 located below the main screen. The subtitle information is provided to the latent image projector by an alphanumeric character generator 100 in synchrony with the visible image on the main screen. The subtitles are perceived only by select viewers who view the polarization perserving screen through an analyzer 36.

The latent image will appear to the unaided eye as a uniformly illuminated screen which, depending upon the ambient lighting and the intensity or brightness of the visible image on the main screen 106, may distract from the presentation of the visible image. Accordingly, a variable attenuator 108 is placed in the latent-image projector 32' to dynamically adjust the intensity of the latent image on the polarization-preserving screen 34 based on the intensity of the visible image on the main screen.

More specifically, the variable attenuator 108 is located in the latent-image projector 32' between the light source 38 and the pre-polarizer 50. A photosensor 110 monitors the brightness or luminance of the main screen 106 and provides a signal based on the main screen's brightness to a brightness control circuit 112. The brightness control circuit adjusts the variable attenuator to regulate the intensity of the light projected onto the polarization-preserving screen. Preferably, the brightness control circuit maintains a constant brightness ratio between the visible image on the main screen and the latent image on the polarization-preserving screen. The variable attenuator preferably is a servocontrolled neutral-density wedge. Alternatively, other neutral-density attenuators, such as variable liquid crystal shutters, can be used. If the color temperature of the light source is not a concern, the brightness control circuit can be modified to change the voltage applied to the light source to adjust the latent-image projector's light output without using a neutral-density attenuator.

Although the foregoing discloses the presently preferred embodiments of the present invention, it is understood that those skilled in the art may make various changes to the preferred embodiments shown without departing from the scope of the invention. The invention is defined only by the following claims.

We claim:

1. A latent-image projection system for creating visual images to entertain viewers, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image.

2. A latent-image projection system as defined in claim 1, wherein the latent-image projector produces the latent image by directing light having a predetermined illumination pattern through an image area, by altering the light's polarization orientation as it passes through the image area at predetermined locations throughout the image area without perceptibly altering the light's intensity at the predetermined locations, and by projecting the polarization-encoded light passing through the image area onto the screen, thereby creating the latent image on the screen so that only the predetermined illumination pattern, and not the latent image, is perceived by viewers who directly view the screen and so that the latent image is perceived by the selected viewer who views the screen using the analyzer.

3. A latent-image projection system as defined in claim 2, wherein the predetermined illumination pattern has a uniform light intensity so that viewers who directly view the screen see only a uniformly illuminated screen, while the selected viewer, who views the screen using the analyzer, sees the latent image.

4. A latent-image projection system as defined in claim 2, wherein the latent-image projector includes a light source that uniformly illuminates the image area with a substantially parallel beam of light;

a pre-polarizer that polarizes the light from the light source to a first polarization orientation before the light illuminates the image area;

a transmissive-type liquid crystal matrix located in the image area and having a pixel array that defines the predetermined locations of the image area, wherein the liquid crystal matrix rotates the polarization direction of the light at the predetermined locations in response to an electrical signal received from a video source as the light passes through the liquid crystal matrix to create the polarization-encoded latent image; and a projection lens that focuses the light passing through the liquid crystal matrix onto the viewing screen.

5. A latent-image projection system as defined in claim 2, wherein the projector includes a light source that uniformly illuminates the image area with a substantially parallel beam of light;

a pre-polarizer that polarizes the light from the light source to a first polarization orientation before the light illuminates the image area;

an anisotropic medium, located in the image area that rotates the polarization direction of the light at the predetermined locations as the light passes through the medium to create the polarization-encoded latent image; and a projection lens that focuses the light passing through the medium onto the viewing screen.

6. A latent-image projection system as defined in claim 5, further comprising:

a transparent isotropic substrate that supports the anisotropic medium, wherein the anisotropic medium on the isotropic substrate is a transparent half-wave retarding material that rotates the light's polarization orientation by 90 degrees and the preferential polarization orientation of the analyzer is orthogonal to the polarization orientation of the pre-polarizer.

7. A latent-image projection system as defined in claim 1, wherein the analyzer is a polarizer of transmissive material that is located in a line of sight between the screen and the selected viewer.

8. A latent-image projection system as defined in claim 7, wherein the analyzer is sized such that only a portion of the screen is viewed through the analyzer by the selected viewer thereby producing a magic window special effect.

9. A latent-image projection system as defined in claim 7, wherein:

the analyzer includes a movable support that controllably moves the analyzer; and the analyzer is sized such that only a portion of the screen is viewed through the analyzer by the selected viewer thereby producing a magic spotlight special effect.

10. A latent-image projection system for creating visual images to entertain viewers, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image, and wherein the analyzer is a specular dielectric surface that is located so that the selected viewer, who views an image of the screen reflected on the dielectric surface at a non-normal angle, may perceive the latent image.

11. A latent-image projection system as defined in claim 10, wherein:

the specular dielectric surface is the surface of a body of water; and a selected viewer can perceive the latent image by viewing the reflected image of the screen on the surface of the water, but cannot perceive the latent image by directly viewing the screen.

12. A latent-image projection system for creating visual images to entertain viewers, comprising:
- a viewing screen that diffusely reflects incident light without changing the light's polarization;
- a latent-image projector that projects onto the screen a polarization-encoded latent image that is imperceptible to a viewer who directly views the screen, wherein the latent image is associated with a predetermined polarization orientation;
- an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image; and
- a vehicle for inducing relative motion between one or more viewers and the analyzer, wherein the vehicle aligns the analyzer between the viewers and the screen during only a part of the relative motion so that the viewers can perceive the latent image when the analyzer is aligned between the viewers and the viewing screen, but the viewers cannot perceive the latent image during the rest of the relative motion when the analyzer is not aligned between the viewers and the screen.

13. A latent-image projection system as defined in claim 12, wherein:
- the vehicle is a passenger vehicle that moves the viewers along a path past the viewing screen; and
- the analyzer is placed at a predetermined location along the path such that, as the vehicle passes the viewing screen, the viewers are unable to perceive the latent image until the vehicle is adjacent to the analyzer.

14. A latent-image projection system as defined in claim 1, further comprising a visible image projector that projects a visible image onto the screen so that viewers who view the screen directly perceive only the visible image without perceiving the latent image and the selected viewer, who views the screen using an analyzer, perceives the latent image.

15. A latent-image projection system as defined in claim 14, wherein the visible image is a polarized visible image having its polarization orientation oriented orthogonal to the polarization orientation associated with the latent image so that viewers, who view the screen directly or through an analyzer having its polarization orientation oriented orthogonal to the polarization orientation associated with the latent image, perceive only the polarized visible image, and the selected viewer, who views the screen using an analyzer having its polarization orientation oriented orthogonal to the polarization orientation of the visible image, perceives only the latent image.

16. A latent-image projection system as defined in claim 14, wherein the visible image is a polarized visible image having its polarization orientation aligned with the polarization orientation associated with the latent image so that viewers, who view the screen directly perceive only the visible image, and the selected viewer, who views the screen using an analyzer having its polarization orientation aligned with the polarization orientation of the visible image, perceives only the latent image superimposed on the visible image.

17. A latent-image projection system for creating visual images to entertain viewers, comprising:
- a viewing screen that diffusely reflects incident light without changing the light's polarization;
- a latent-image projector that projects onto the screen a polarization-encoded latent image that is imperceptible to a viewer who directly views the screen, wherein the latent image is associated with a predetermined polarization orientation;
- an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image; and
- a real three-dimensional object located to one side of the screen, wherein the analyzer is a dielectric surface oriented such that direct light rays from the real object are transmitted through the analyzer and such that light from the screen having a desired polarization orientation is reflected off the dielectric surface so that the latent image provides a ghost-like image superimposed over the real object.

18. A latent-image projection system as defined in claim 1, wherein a portion of the latent image contains alphanumeric subtitles relating to a visible image projected on the screen.

19. A latent-image projection system for creating visual images to entertain viewers, comprising:
- a viewing screen that diffusely reflects incident light without changing the light's polarization;
- a latent-image projector that projects onto the screen a polarization-encoded latent image that is imperceptible to a viewer who directly views the screen, wherein the latent image is associated with a predetermined polarization orientation; and
- an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image,
- wherein a portion of the latent image contains alphanumeric subtitles relating to a visible image projected on the screen, and
- wherein the latent-image projector includes
- a light source that uniformly illuminates an image area with a substantially parallel beam of light;
- a pre-polarizer that polarizes the light from the light source to a first polarization orientation before the light illuminates the predetermined image area;
- a polarization-rotating device located in a lower portion of the image area and having a pixel array that defines predetermined locations in the image area, wherein the polarization-rotating device rotates the polarization direction of the light at the predetermined locations in response to an electrical signal received from an alphanumeric image source as the light passes through the polarization-rotating device to create the polarization-encoded latent image;
- visible image film, located in the image area, that is illuminated by the light from the light source, including the light passing through the polarization-rotating device;
- a projection lens that focuses the light passing through the film onto the viewing screen, wherein the selected viewer who views the screen using the analyzer perceives the alphanumeric subtitles, whereas viewers who directly view the screen cannot perceive the alphanumeric subtitles.

20. A latent-image projection system as defined in claim 19, wherein the polarization-rotating device is a liquid crystal matrix.

21. A latent-image projection system for creating visual images to entertain viewers, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image; and a sign that includes a visible message and that is located adjacent to the viewing screen, wherein the latent image includes a foreign language translation of the sign's message.

22. A latent-image projection system for creating visual images to entertain viewers, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image.

wherein the viewing screen includes an integral sign that provides a visible message; and the latent-image includes a foreign language translation of the sign's message.

23. A latent-image projection system for creating visual images to entertain viewers, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers, wherein the analyzer has a preferential polarization orientation that is aligned with the predetermined polarization orientation associated with the latent image, so that a selected viewer, who uses the analyzer to view the screen, may perceive the latent image a main screen located above the viewing screen;

a visible-image projector that projects onto the main screen a visible image having a temporally variable intensity;

a photosensor that generates an intensity signal based on the intensity of the visible image on the main screen; and a control circuit, responsive to the intensity signal, that controls the intensity of the latent image such that the intensity of the latent image varies in response to the intensity variations of the visible image.

24. A latent-image projection system as defined in claim 23, wherein:

the visible image on the main screen is a motion picture; and the latent image contains alphanumeric information relating to the motion picture.

25. A latent-image projection system as defined in claim 23, wherein the latent-image projector includes a light source that uniformly illuminates an image area with a substantially parallel beam of light;

a variable attenuator that varies the intensity of the light from the light source in response to the control signal generated by the control circuit based on the intensity signal;

a pre-polarizer that polarizes the light from the variable attenuator to a first polarization orientation before the light illuminates the image area;

a polarization-rotating device located in the image area and having a pixel array that defines predetermined locations in the image area, wherein the polarization-rotating device rotates the polarization direction of the light at the predetermined locations in response to an electrical signal received from an alphanumeric character generator as the light passes through the polarization-rotating device to create the polarization-encoded latent image; and a projection lens that focuses the light passing through the polarization-rotating device.

26. A latent-image projection system as defined in claim 25, wherein the polarization-rotating device is a liquid crystal matrix.

27. A latent-image projection system as defined in claim 23, wherein the latent-image projector includes a light source that uniformly illuminates an image area with a substantially parallel beam of light, wherein the intensity of the light from the light source is controlled by the control circuit based on the intensity signal;

a pre-polarizer that polarizes the light from the variable attenuator to a first polarization orientation before the light illuminates the image area;

a transmissive-type liquid crystal matrix located in the image area and having a pixel array that defines predetermined locations in the image area, wherein the liquid crystal matrix rotates the polarization direction of the light at the predetermined locations in response to an electrical signal received from an alphanumeric character generator as the light passes through the liquid crystal matrix to create the polarization-encoded latent image; and a projection lens that focuses the light passing through the liquid crystal matrix onto the viewing screen.

28. A method using a latent image to create visual images for entertaining viewers of said amusement ride, comprising:

projecting light having a polarization-encoded latent image onto a polarization-preserving viewing screen that diffusely reflects incident light, wherein the latent image is imperceptible to a viewer who directly views the screen; and analyzing in a selected with an analyzer with predetermined dimensions relative to said viewing screen and positioned a predetermined distance from said viewing screen for one or more selected viewers of said amusement ride the light reflected from the screen so that the selected viewers may jointly perceive the latent image through the screen.

29. A method as defined in claim 28, wherein the polarization-encoded latent image projected onto the screen has a uniform light intensity so that viewers, who view the screen directly, see only a uniformly illuminated screen while the selected viewer who views the analyzed light sees the latent image.

30. A method as defined in claim 28, wherein the step of projecting includes:
uniformly illuminating an image area with a substantially parallel beam of light;
polarizing the light from the light source to a first polarization orientation before the light illuminates the image area;
rotating the polarization orientation of the light at predetermined locations in the image area in response to an electrical signal received from a video source as the light passes through the image area to create the polarization-encoded latent image; and
focusing the light passing through the image area onto the viewing screen.

31. A method as defined in claim 28, wherein the step of projecting includes:
uniformly illuminating an image area with a substantially parallel beam of light;
polarizing the light from the light source to a first polarization orientation before the light illuminates the image area;
rotating the polarization orientation of the light at predetermined locations in the image area as the light passes through the image area to create a static polarization-encoded latent image;
focusing the light passing through the image area onto the viewing screen.

32. A method as defined in claim 28, wherein the step of analyzing includes analyzing only a portion of the screen to produce a magic window special effect.

33. A method as defined in claim 28, wherein the step of analyzing includes analyzing only a portion of the screen and shifting the analyzed portion to produce a magic spotlight special effect.

34. A method using a latent image to create visual images for entertaining viewers, comprising:
projecting light having a polarization-encoded latent image onto a polarization-preserving viewing screen that diffusely reflects incident light, wherein the latent image is imperceptible to a viewer who directly views the screen; and
analyzing for one or more selected viewers the light reflected from the screen so that the selected viewer who views the analyzed light may perceive the latent image, wherein the step of analyzing includes reflecting, at a non-normal angle of incidence, an image of the screen using a specular dielectric surface.

35. A method as defined in claim 34, wherein the specular dielectric surface is the surface of a body of water.

36. A method using a latent image to create visual images for entertaining viewers, comprising:
protecting light having a polarization-encoded latent image onto a polarization-preserving viewing screen that diffusely reflects incident light, wherein the latent image is imperceptible to a viewer who directly views the screen; and
analyzing for one or more selected viewers the light reflected from the screen so that the selected viewer who views the analyzed light may perceive the latent image
inducing relative motion between a viewer and the screen; and
selectively analyzing the light reflected from the screen so that, during only a part of the relative motion, the viewer can perceive the latent image, and so that, during the rest of the relative motion, the viewer cannot perceive the latent image.

37. A method as defined in claim 28, further comprising:
projecting a visible image onto the screen so that viewers who view the screen directly perceive only the visible image and so that the selected viewer who views the analyzed light perceives the latent image superimposed on the visible image.

38. A method as defined in claim 37, wherein the visible image is a polarized visible image having its polarization orientation oriented orthogonal to a polarization orientation associated with the latent image so that viewers who view the screen directly perceive only the polarized visible image and so that the selected viewer who views the analyzed light perceives only the latent image.

39. A method using a latent image to create visual images for entertaining viewers, comprising:
protecting light having a polarization-encoded latent image onto a polarization-preserving viewing screen that diffusely reflects incident light, wherein the latent image is imperceptible to a viewer who directly views the screen; and
analyzing for one or more selected viewers the light reflected from the screen so that the selected viewer who views the analyzed light may perceive the latent image, wherein the step of analyzing includes orienting the analyzed light so that it is superimposed over light from a real three-dimensional object to provide a visual effect of a ghost-like image superimposed over the real object.

40. A method as defined in claim 28, wherein a portion of the latent image contains alphanumeric subtitles relating to a visible image projected on the screen.

41. A method as defined in claim 28, further comprising:
causing the latent image to provide alphanumeric information relating to a visible image.

42. A method as defined in claim 41, wherein the alphanumeric information provided by the latent image is a foreign language translation of a message presented by the visible image.

43. A method using a latent image to create visual images for entertaining viewers, comprising:
protecting light having a polarization-encoded latent image onto a polarization-preserving viewing screen that diffusely reflects incident light, wherein the latent image is imperceptible to a viewer who directly views the screen;
analyzing for one or more selected viewers the light reflected from the screen so that the selected viewer who views the analyzed light may perceive the latent image
projecting a motion picture onto a main screen located above the viewing screen; and causing the latent image to provide alphanumeric information relating to the motion picture.

44. A method as defined in claim 43, further comprising:

monitoring the intensity of light reflected from the main screen;

adjusting the intensity of the light projected onto the viewing screen based on the intensity of the light reflected from the main screen.

45. A latent-image projection system for use with an amusement ride, for creating visual images to entertain viewers of said ride, comprising:

a viewing screen that diffusely reflects incident light without changing the light's polarization;

a latent-image projector that projects onto the screen a polarization-encoded latent image that is imperceptible to a viewer who directly views the screen, wherein the latent image is associated with a predetermined polarization orientation; and an analyzer located between the screen and one or more selected viewers of said ride, said analyzer configured with predetermined dimensions relative to the screen and positioned a predetermined distance from to the screen to enable joint viewing through said analyzer by said selected viewers, wherein the analyzer has a preferential polarization orientation that is aligned with the predetermined polarization orientation associated with the latent image, so that a selected viewer, who uses the analyzer to view the screen, may perceive the latent image.

46. A method using a latent image to create visual images for entertaining viewers of said amusement ride, comprising:

projecting light having a polarization-encoded latent image onto a polarization-preserving viewing screen that diffusely reflects incident light, wherein the latent image is imperceptible to a viewer who directly views the screen; and analyzing in a selected with an analyzer with predetermined dimensions relative to said viewing screen and positioned a predetermined distance from said viewing screen for one or more selected viewers of said amusement ride the light reflected from the screen so that the selected viewers may jointly perceive the latent image through the screen.

* * * * *